United States Patent [19]
Conliffe

[11] Patent Number: 5,098,632
[45] Date of Patent: Mar. 24, 1992

[54] METHOD FOR FORMING A DOOR PANEL BELT TRIM

[75] Inventor: Robert G. Conliffe, Knoxville, Tenn.

[73] Assignee: Davidson Textron Inc., Dover, N.H.

[21] Appl. No.: 740,970

[22] Filed: Aug. 6, 1991

Related U.S. Application Data

[62] Division of Ser. No. 420,471, Oct. 12, 1989, Pat. No. 5,052,913.

[51] Int. Cl.⁵ .............................................. B29C 53/04
[52] U.S. Cl. ..................................................... 264/339
[58] Field of Search ................ 264/339, 295; 425/394

[56] References Cited

U.S. PATENT DOCUMENTS

| | | | |
|---|---|---|---|
| 2,350,915 | 6/1944 | Miller | 425/394 |
| 2,937,689 | 5/1960 | Peterson | 425/394 |
| 3,149,376 | 9/1964 | Lee | 425/394 |
| 3,616,076 | 10/1971 | Gepkins | 156/479 |
| 3,888,613 | 6/1975 | Frief et al. | 425/384 |
| 4,030,870 | 6/1977 | Bunce | 425/383 |
| 4,035,224 | 7/1977 | Anderson | 156/475 |
| 4,092,840 | 6/1978 | Eckold et al. | 72/321 |
| 4,465,453 | 8/1984 | Turner et al. | 425/394 |
| 4,747,768 | 5/1988 | Crupi | 425/394 |

*Primary Examiner*—James Lowe
*Attorney, Agent, or Firm*—Reising, Ethington, Barnard, Perry & Milton

[57] ABSTRACT

A method for forming a return flange on the belt trim portion of a vehicle door panel which includes the steps of locating the door panel on a holding fixture to place the belt trim portion for sequential clamping, backing, spot heating and folding to form the return flange thereon; apparatus for practicing the method which includes a door fixture means with movable backing member to back a belt trim portion when the panel is clamped in place; and a heater mechanism and a flange former mechanism on the machine are sequentially advanced with respect to the clamped door panel to soften a thermoformable segment of the panel which is folded about the back-up plate.

3 Claims, 4 Drawing Sheets

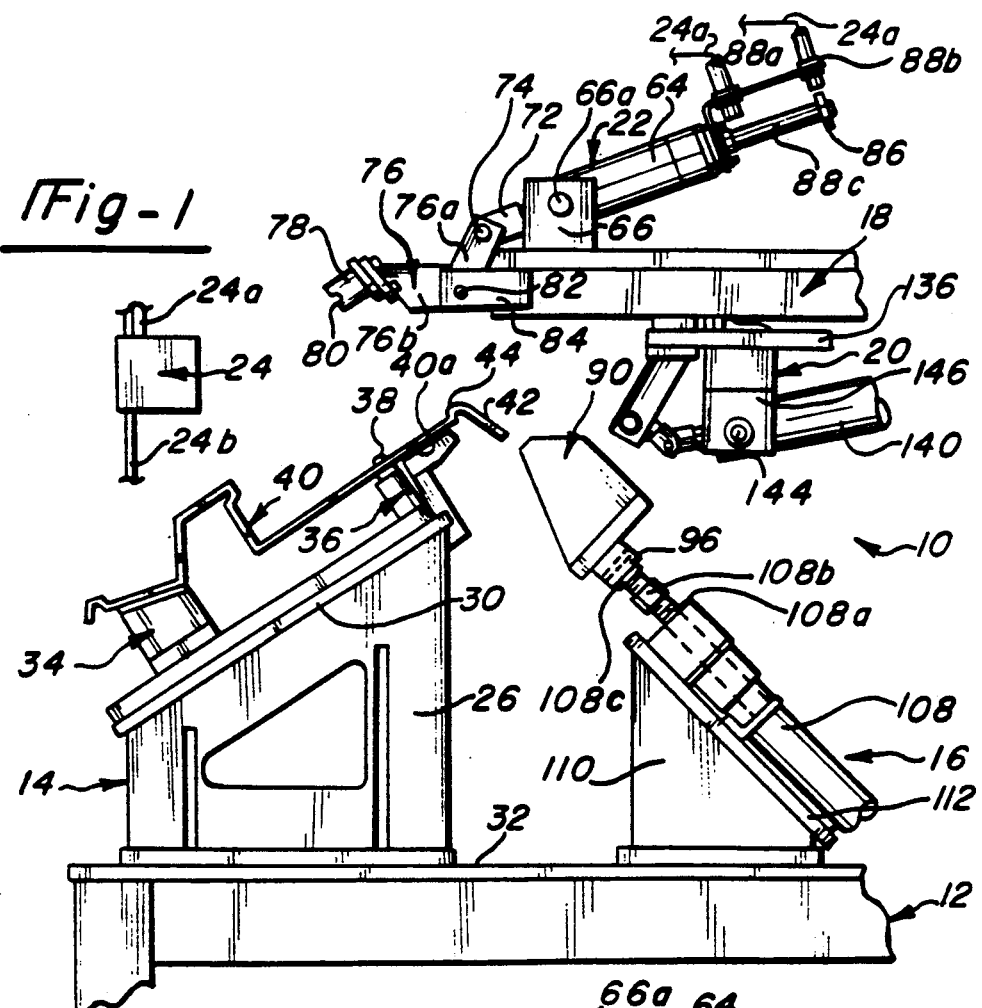

METHOD FOR FORMING A DOOR PANEL BELT TRIM

This is a division of application Ser. No. 420,471 filed on Oct. 12, 1989 now U.S. Pat. No. 5,052,913.

TECHNICAL FIELD

This invention relates to apparatus for shaping thermoformable plastic panels and more particularly to apparatus and methods for shaping a belt trim portion of a plastic vehicle door panel.

BACKGROUND ART

U.S. Pat. No. 4,839,118 discloses a glove compartment box with a plastic rear wall portion that has integral flanges thereon thermally formed to fasten the rear wall with respect to the outer shell of the glove box.

While suitable for its intended purpose, the '118 patent does not address the problem of how to form a return flange at the belt trim support of a vehicle door panel so as to avoid thermal stress conditions in the vehicle door panel which will cause it to be warped.

One approach for forming vehicle door panels with return bends on the belt trim support is to provide an injection molding machine with dies configured to have the return bend formed therein. The return flange portion of the finished part constitutes a die-locked feature which can only be formed by use of retractable die members that add to the cost of injection molding machines.

STATEMENT OF INVENTION AND ADVANTAGES

An object of the present invention is to provide a vehicle door panel with a belt trim portion thereon which is thermoformable to form a return flange thereon without warping the panel.

Another object of the present invention is to provide a vehicle door panel with a return flange on the belt trim support thereof which is formed without requiring special retractable injection mold tooling for releasing a die locked return flange from mold apparatus.

Yet another object of the invention is to provide an improved method for forming a return flange on the belt trim portion of a vehicle door panel which includes the steps of locating the door panel on a holding fixture to place the belt trim portion for sequential clamping, backing, spot heating and folding to form the return flange thereon.

Yet another feature of the present invention is to provide a method for thermoforming the belt trim portion of a vehicle door panel including the steps of providing a door panel with a thermoformable bent end having a corner, a distal end and a smooth outer surface and an inner surface having a notch along the width of the bent end for defining a breakline for formation of a return flange thereon; locating the door panel on a panel fixture having locating pins thereon and a backing member movable with respect to the fixture to be selectively engageable with the bent end of a door panel supported thereon; locating the door panel on the panel fixture to expose the bent end and the notch therein at a point for heating and bending with respect to the fixture; applying clamping forces on the exterior of the corner and at the inner surface of the heated bent end between the corner of the bent end and the notch; applying heat to the outer surface of the bent end at the notch at a rate to prevent thermal stress build-up in the door panel which will cause the panel to warp; thereafter applying clamping forces on the exterior of the corner and at the inner surface of the heated bent end between the corner of the bent end and the notch; folding the heated bent end between the notch and the distal end thereof to form a return flange thereon bent reversely to the panel and at 90 degrees to the bent end; and cooling the bent end and removing the clamping forces therefrom and thereafter removing the shaped door panel from the door holding fixture.

A further feature of the present invention is to provide such a method further characterized by applying the clamping force by providing a initial back up force against the inner surface of the bent end prior to application of the clamping force on the exterior of the corner of the bent end.

Still another feature of the present invention is to provide such a method further characterized by folding the heated bent end by directing a holding force against the outer surface of the heated bent end and then pivoting the holding force with respect to the heated bend end to cause the bend end to be formed against the holding fixture from the notch to the distal end of the heated bent end.

Still another feature of the invention is to provide apparatus for practicing the method which includes a door fixture means with a movable backing member to back a belt trim portion when the panel is clamped in place; a heater mechanism and a flange former mechanism on the machine are sequentially advanced with respect to the clamped door panel to soften a thermoformable segment of the panel which is then folded about the backup plate.

Yet another feature of the present invention is to provide apparatus for shaping a return flange on the bent end of a thermoformable plastic vehicle door panel the apparatus including door fixture means supported on a machine base and including a movable backup member having a retracted position and an extended position and positionable in the retracted position when the bent end is initially loaded on the door fixture means; the apparatus further including clamp means for selectively clamping and unclamping the bent end when the door panel is supported on the door fixture means and means for spot heating the bent end when the bent end is clamped to soften the thermoformable material of the bent end without producing differential thermal stresses in the vehicle door panel capable of warping the panel; the apparatus further including shaping means operable following heating of the bent end to apply a force on the bent end to form a reversely bent return flange thereon.

Other advantages, features and objects of the present invention will be readily appreciated as the same becomes more apparent by reference to the following detailed description when considered in conjunction with the accompanying drawings wherein:

BRIEF DESCRIPTION OF THE INVENTION

FIG. 1 is a fragmentary side elevational view of apparatus in accordance with the present invention showing the component parts thereof in their home position;

FIGS. 2–4 are fragmentary side elevational views of the apparatus of FIG. 1 showing the component parts respectively in a clamping position; a heating position and in a bending position;

DETAILED DESCRIPTION OF PREFERRED EMBODIMENTS OF THE INVENTION

Figure 3:
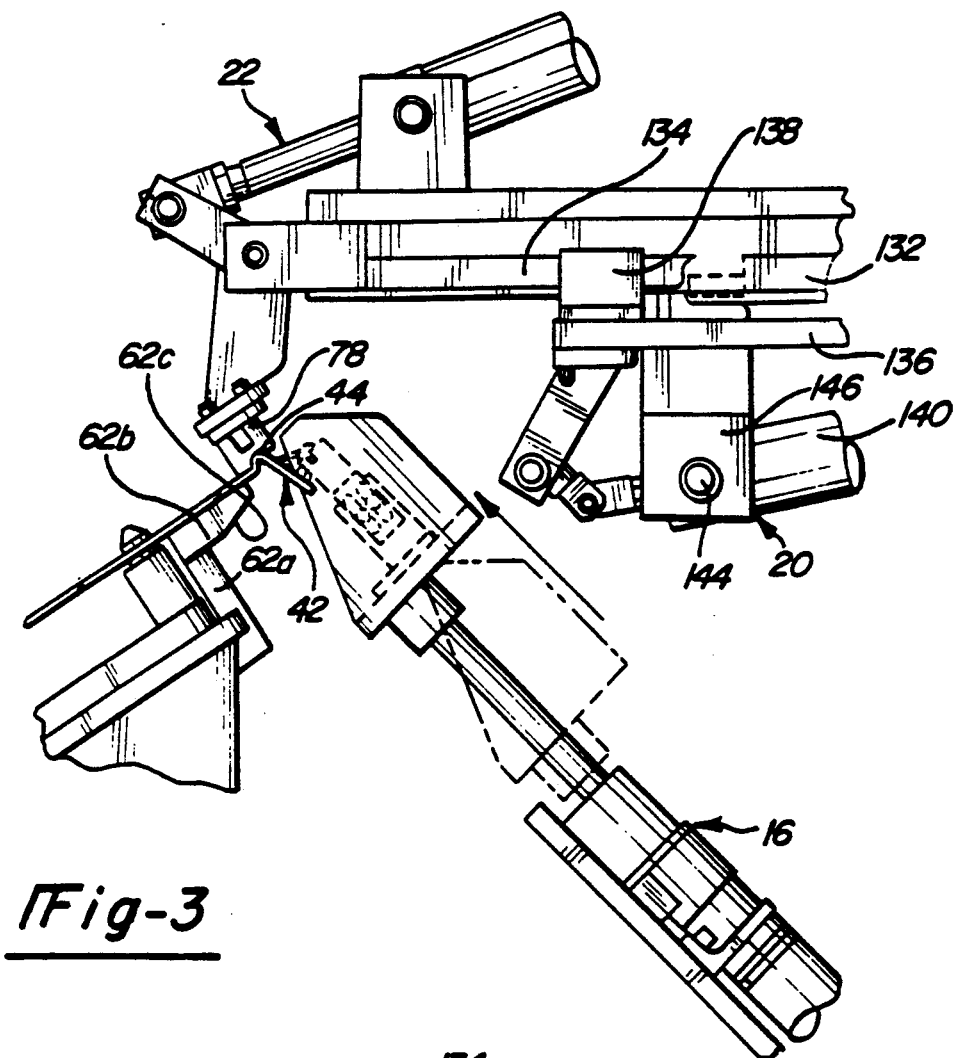

FIG. 1 shows a machine apparatus 10 having a base 12 with a door panel holding fixture 14 on one side thereof. A heating mechanism 16 is supported on the other side of base 14. The machine includes an overhead frame 18 carrying a flange former mechanism 20 and a clamp mechanism 22. The machine apparatus more particularly is operative under the control of a controller 24 which receives signals over lines 24a from suitable sensing means such as limit switches (to be described) and operative to produce a plurality of control signals on lines 24b that are operative to control the operation of drive components (to be described).

Figure 6:
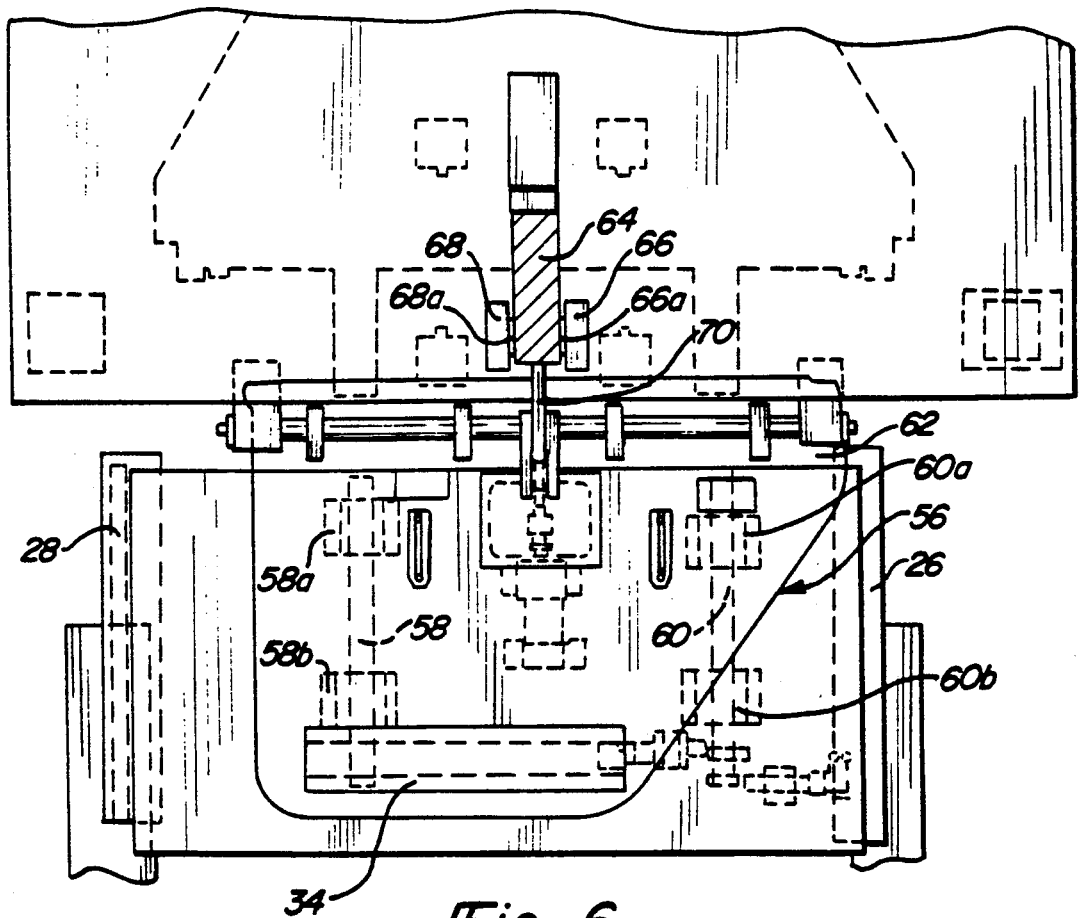
FIG. 6 is a top elevational view of a door panel support fixture in the apparatus of FIG. 1.

Referring now more particularly to FIGS. 1 and 6, the door panel holding fixture 14 is illustrated as having a pair of trapezoidally configured sides 26, 28 for supporting a platform 30 on an inclination with respect to the horizontal surface 32 of the base. The degree of inclination is selected so that the operator loads door panels into the machine apparatus 10 at approximately 30°. This locates a belt trim portion of the door panel at the top of the fixture 14.

More particularly, the fixture 14 includes a lower support member 34 that is secured to the platform 30 by suitable fastening means. An upper support member 36 is connected to the upper end of the platform 30. The upper support member 36 has a pin 38 thereon that serves to locate the door panel 40 on the fixture 14 for subsequent formation of a return flange thereon.

Figure 9:
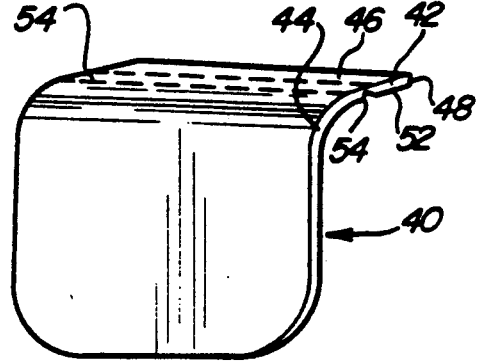
FIG. 9 is a perspective view of a vehicle door panel prior to forming a reverse bend at the belt trim surface thereof.

More specifically, referring now to FIG. 9, a vehicle door panel 40 is illustrated that includes a bent end 42 having a corner 44 thereon and a surface portion 46 that defines a belt trim support on the door panel 40 when the panel 40 is assembled in a door assembly.

Figure 10:
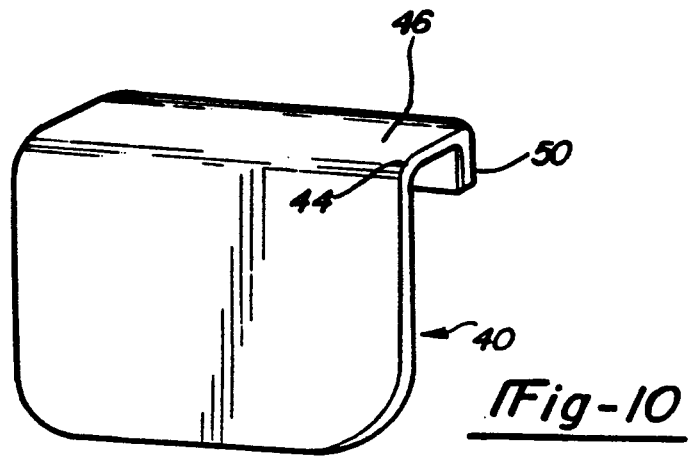
FIG. 10 is a perspective view of a vehicle door panel following formation of the reverse bend thereon.

The panel 40 further includes a distal end 48 on the bent end 42 which, in accordance with the present invention, will be shaped to form a return flange 50 on a finished door panel as shown in FIG. 10.

The inner surface 52 of the bent end 42 has a notch 54 formed therein along the width of the bent end 42 of the panel 40.

In accordance with the present invention, the panel 40 is formed of a thermoformable material such as ABS plastic, acrylic plastics, thermoplastic olefins, nylon or rigid PVC.

In order to support the bent end 42 during a thermoforming process to be described, the door panel holding fixture 40 includes a back-up apparatus 56 which more particularly includes a pair of spaced guide shafts 58, 60 supported for reciprocal movement in spaced bearing blocks 58a, 58b and 60a, 60b, respectively. The shafts 58, 60 carry a backing plate 62 having a vertical portion 62a with a backing plate head 62b thereon with a surface 62c which will shape the return flange 50 when it is formed on the bent end 42 in accordance with the invention.

As shown in FIG. 1, the backing plate 62 is in a retracted position where it will support the, panel 40 at the surface 40a thereon.

In this position, the bent end 42 is located at the top of the fixture 14 where it is exposed for clamping and heating operations to be described.

Once the panel 40 is located on the fixture 14, as shown in FIG. 1, the clamp mechanism 22 is operative to be moved into the position shown in FIG. 2 for holding the bent end 42 in a position for subsequent heating and forming operations. In order to effectuate such clamping, the clamping mechanism 22 more particularly includes a power cylinder 64 that is pivotally connected to a pair of spaced bearing blocks 66, 68 by a pair of trunions 66a, 68a, respectively. The power cylinder 64 is a double acting air cylinder having a piston rod 70 extending from the lower end thereof. Rod 70 is connected to a knuckle 72 in turn pivotally connected by a pivot pin 74 to one end 76a of a clamp element 76 having the opposite end 76b thereof connected to a tool 78 with a notched surface 80 thereon configured to supportingly receive the corner 44 of the bent end 42.

The clamp element 76, more particularly, is pivotally supported by a pivot pin 82 carried on a bracket 84 on the overhead frame 18 to provide for movement into a retracted home position 76c, shown in broken outline in FIG. 2, or into a clamping position 76d, shown in solid line in FIG. 2. The operating position of the power cylinder 22 is sensed when a collar 86 is moved with respect to limit switch sensors 88a and 88b. The collar 86 is supported on a rod extension 88c from the cylinder 22. The rod extension 88c will be positioned to locate the collar 86 with respect to the limit switch sensor 88a when the clamp mechanism 22 is in its clamping position 76d and will be positioned into alignment with the limit switch sensor 88b when the clamp mechanism 22 is in its retracted position 76c. The respective limit switch signals will be utilized by controller 24 to initiate other machine functions including heating and forming steps to be described.

Figure 5:
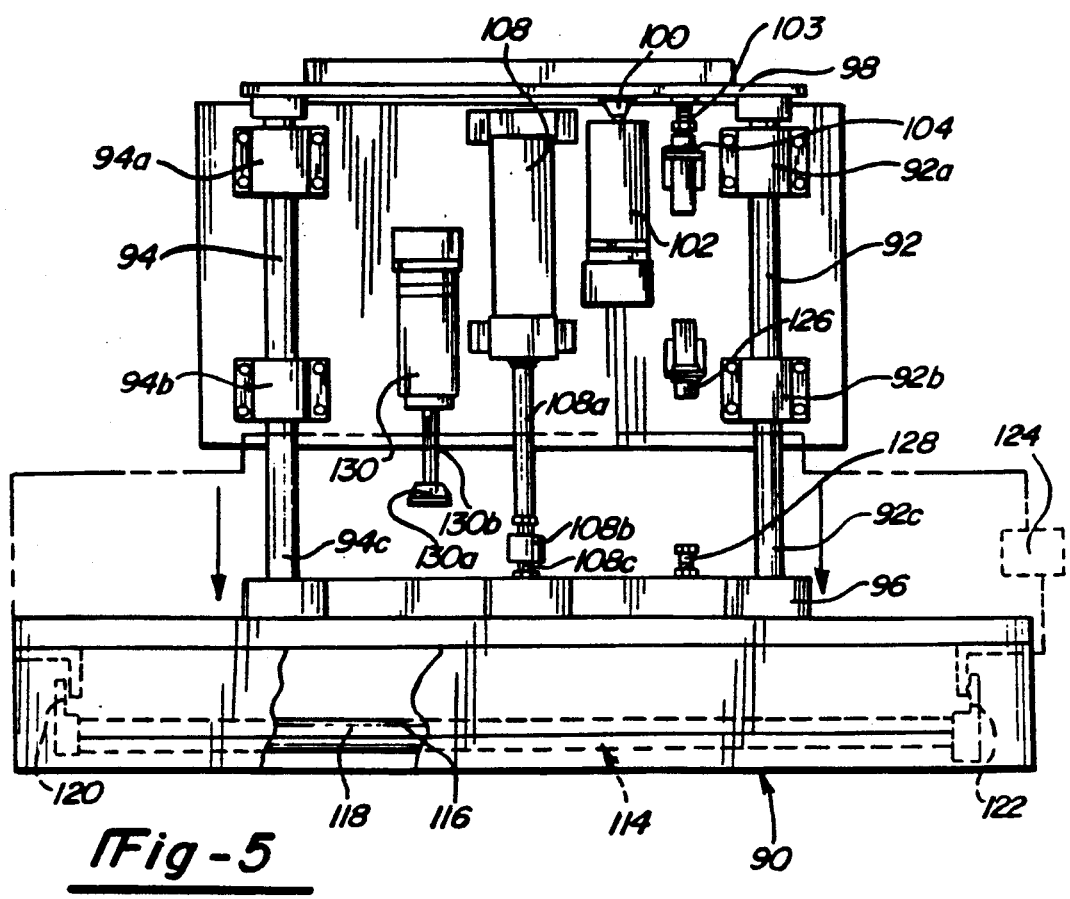
FIG. 5 is a top elevational view of a heating mechanism in the apparatus of FIG. 1.

Referring now more specifically to the heating mechanism 16, as shown in FIGS. 1 and 5, a heater head 90 is connected to a pair of guide shafts 92, 94 as best shown in FIG. 5. The guide shafts 92, 94 are supported for reciprocation with respect to bearing blocks 92a, 92b and 94a, 94b, respectively. The inboard ends 92c, 94c of the guide shafts 92, 94 are connected to a plate 96 secured to the heater head 90. The opposite ends of the guide shafts 92, 94 are connected to a plate 98 having a bumper 100 thereon selectively engageable with a shock absorber mechanism 102 for controlling movement of the head 90 when it reaches the heating position shown in FIG. 3.

The plate 98 carries an adjustable sensing element 103 with respect to a limit switch sensor 104 to signal movement of the heater head 90 into the heating position of FIG. 3 to initiate a high temperature output therefrom under the control of the controller 24. More specifically, operation of the heater head 90 into its heating position is produced by a drive cylinder 108 connected to a heater platform 110 with an upper surface 112 formed at an inclination with respect to the surface 32 of the base 12. The drive cylinder 108 has a piston rod 108a extending therefrom connected by a coupling 108b to a threaded fitting 108c on the plate 96. When the piston rod 108a is extended, the heater head 90 will be located as shown in FIG. 3 to cause an infrared heater 114 therein to be located in overlying relationship across the width of the outer surface at a point overlying the notch 54 in the bent end 42. More specifically, the infrared heater 114 includes a quartz or pyrex tube 116 and a resistance element 118 that is electrically connected between terminals 120, 122 to a power source 124 (FIG. 5) under the control of the controller 24. The power source 124 is operative to energize the resistance element 118 at high and low heat output states in response to signals from limit switch sensors 104, 126.

When the heater head 90 is located in the heat forming position of FIG. 3, the resistance element 118 is energized at the high temperature level to spot heat the bent end 42 along a bend line along the width thereof in a concentrated manner so as to prevent excessive heating of the remainder of the panel 40. The limit switch sensor 126 senses retraction of the heater head 90 as sensor 126 moves into proximity with an adjustable limit switch element 128 on the plate 96. When retraction of the heater head 90 is sensed, the controller 24 will condition the power sources 124 to direct power to the resistance wire 118 to maintain the heater in a low energy output state. When the heater head 90 is retracted, the position will be held by a stop cylinder 130 on the platform 110 having a bumper 130a connected to a piston rod 130b of the stop cylinder 130.

Figure 4:
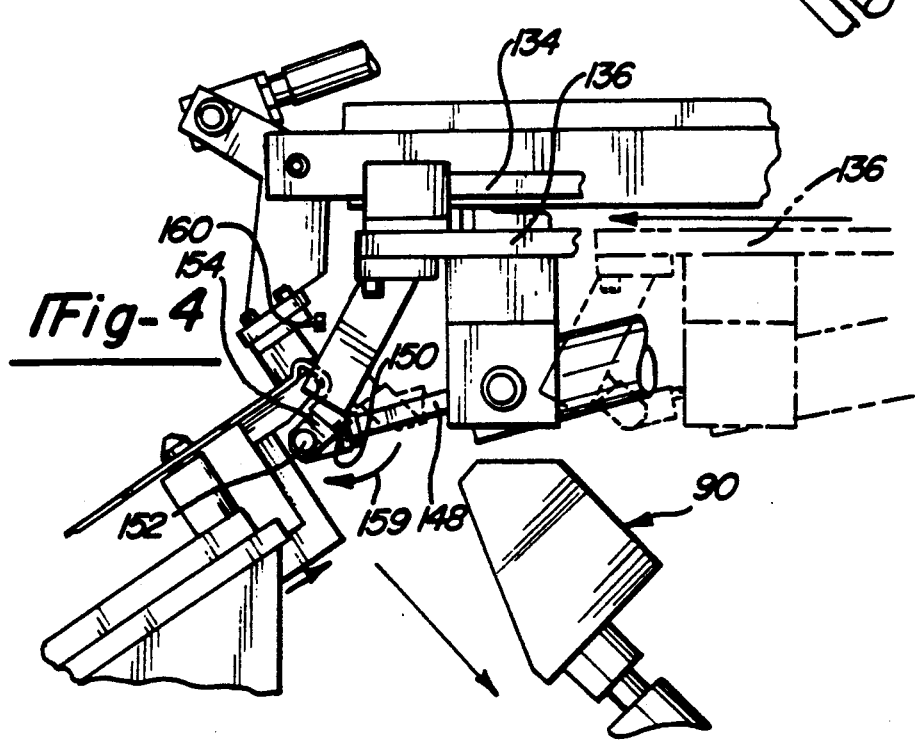
Figure 7:
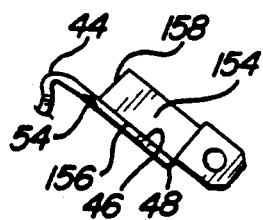
FIG. 7 is a fragmentary view of a flange former prior to folding.
Figure 8:
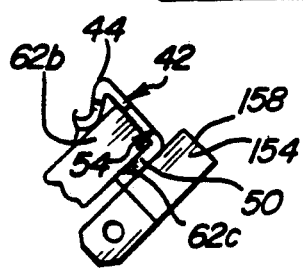
FIG. 8 is a fragmentary view of a flange former following folding.

As shown in FIG. 3, the clamp mechanism 22 is located to cause the fixturing tool 78 to be clamped against the corner 44 of the bent end 42. During the heating mode shown in FIG. 3, the flange former mechanism 20 is located in its home position by a power cylinder 132. Following the heating step, the flange former mechanism 20 is actuated by the cylinder 132 to move on guide shafts 134, one of which is shown in FIG. 3. The platform 136 of the former 20 is supported on the guide shafts 134 by bearing blocks, one of which is shown at 138 in FIG. 3. The flange former mechanism 20 includes a second air cylinder 140 having its head 142 pivotally connected by a trunion 144 to a pair of support blocks 146 on the underside of the platform 136. The power cylinder 140 has a piston rod 148 (shown extended in FIG. 4) connected to a knuckle 150 that in turn is pivotally connected by a pin 152 to a forming bar 154. Forming bar 154 has a surface 156 thereon engageable with the outer surface 46 of the vehicle door panel 40, as shown in FIG. 7. The end 158 of the forming bar 154 is located closely adjacent the notch 54 when the slide cylinder 132 moves the bending bar 154 into initial engagement with the bent end 42, as shown in FIG. 7. Once the forming bar 154 is in engagement with the bent end 42, the piston rod 148 is extended from cylinder 140 to cause the forming bar 154 to rotate along the path 159 downwardly from the position shown in broken line in FIG. 4 to the solid line position shown in FIG. 4. This causes the bent end 42 to fold from the notch 54 to the distal end 48 thereof downwardly against the surface 62c of the backing plate head 62b so as to form the resultant return bend 50 on the panel 40. Air jets 160 (FIG. 4) are then turned on to cool the thermoformed end of the panel 40. The clamp mechanism 22 is then retracted into its home position shown in FIG. 1. The backup apparatus 56 is retracted to enable the finished part to be removed from the door panel holding fixture 14.

INDUSTRIAL APPLICABILITY

While the illustrated apparatus and method are shown with reference to a door panel having a belt trim support thereon with a 90° return flange, it will be appreciated that the apparatus and method are equally suited for forming 90° return bends on other panels, such as shower or bath panels for use in the plumbing industry, covers or container panels for use in the packaging or the luggage industry, or for use in other panel structures used in both auto vehicle interior trim products and auto vehicle exterior trim products.

The invention herein has been described in an illustrative manner and it is understood that the terminology which has been used it intended to be in the nature of words of description rather than of limitation. Obviously, many modifications and variations of the present invention are possible in light of the above teachings. It is, therefore, to be understood that the invention may be practiced otherwise than as specifically described herein and yet remain within the scope of the appended claims.

What is claimed is:

1. A method for forming a return flange on the bent end of a panel formed of thermoformable plastic material comprising the steps of:
   providing a panel holding fixture having locating pins thereon and a backing member movable respect to the fixture to be selectively engageable with the bent end of a panel supported thereon;
   providing a thermoformable panel with a bent end, with a corner with a distal end, with an outer surface and with an inner surface having a notch along the width of the bent end for defining a breakline for formation of the return flange thereon;
   locating the panel on the panel holding fixture to expose the bent end and the notch therein at a point for heating and bending with respect to the fixture;
   applying clamping forces on the exterior of the corner and at the inner surface of the bent end between the corner of the bent end and the notch;
   applying heat to the outer surface of the bent end only at the notch and at a rate to control thermal stress build-up in the panel to prevent warping the panel;
   folding the heated bent end between the notch and the distal end thereof to form a return flange thereon; and
   cooling the bent end and releasing the clamping forces therefrom and thereafter removing the panel from the holding fixture.

2. The method of claim 1 further characterized by applying the clamping forces by providing a initial back up force against the inner surface of the bent end prior to application of the clamping force on the exterior of the corner of the bent end.

3. The method of claim 1 further characterized by folding the heated bent end by directing a holding force against the outer surface of the bent end and then pivoting the holding force with respect to the bend end to cause it to be formed against the holding fixture from the notch to the distal end of the bent end.

* * * * *